May 30, 1961 H. C. VERNON ET AL 2,986,508
NEUTRONIC REACTOR STRUCTURE
Filed Oct. 11, 1945 3 Sheets-Sheet 1

Witnesses:
Herbert E. Metcalf
Walter S. Schlegel, Jr.

Inventors:
Harcourt C. Vernon
Alvin M. Weinberg
By: Robert A. ———
Attorney

May 30, 1961  H. C. VERNON ET AL  2,986,508
NEUTRONIC REACTOR STRUCTURE
Filed Oct. 11, 1945

Witnesses:
Herbert E. Metcalf
Walter L. Schlegel, Jr.

Inventors:
Harcourt C. Vernon
Alvin M. Weinberg
By: Robert A. [Ronender]
Attorney.

United States Patent Office 2,986,508
Patented May 30, 1961

2,986,508

NEUTRONIC REACTOR STRUCTURE

Harcourt C. Vernon, Wilmington, Del., and Alvin M. Weinberg, Oak Ridge, Tenn., assignors to the United States of America as represented by the United States Atomic Energy Commission Filed Oct. 11, 1945, Ser. No. 621,841

2 Claims. (Cl. 204—193.2)

This invention relates to neutronic reactors, and to novel articles of manufacture and methods used in and in combination with such reactors.

In neutronic reactors a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general such reactors comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ (heavy water) are typical moderators suitable for such use. Heat is evolved during the reaction which is removed by passage of a coolant through the reactor or in heat exchange relationship therewith. Specific details of the theory and essential characteristics of such reactors are set forth in the co-pending application of Enrico Fermi and Leo Szilard, Serial No. 568,904, filed December 19, 1944, now Patent No. 2,708,656.

The ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size therefore, differs from K by the external leakage factor, and by a factor due to the neutron absorption by localized neutron absorber, and the reproduction ratio must still be sufficiently greater than unity to permit the neutron density to rise exponentially with time in the system as built.

During the interchange of neutrons in a system of finite size, comprising bodies of any size disposed in a neutron moderator, neutrons may be lost to the chain reaction in the following ways:

(1) By absorption or capture in the uranium content of the bodies without producing fission;

(2) By absorption or capture in the moderator material itself;

(3) By absorption or capture by the impurities present in both the uranium bodies and the moderator; and (4) By leakage out of the system through the periphery thereof.

The present invention relates particularly to the reduction of neutron losses through the periphery of the reactor and a general object of the invention is to provide a novel method and means for reducing such losses.

Another object of the invention is to provide a novel composition around the reactor for reducing neutron losses therefrom.

Another object of the invention is to provide a novel reflector including means for reflecting neutrons and means for developing neutrons many of which enter the reactor to increase the number of neutrons therein available for the purpose of sustaining a chain reaction. This object is accomplished by the provision of a reflector in the form of a reactive composition including fissionable material and neutron moderator.

Still another object of the invention is to provide a novel neutron reflector comprising a lattice of uranium-containing rods suspended in an ordinary water ($H_2O$) neutron moderator.

Other objects and advantages are apparent from the following description taken with the accompanying drawings, in which.

Figure 1:
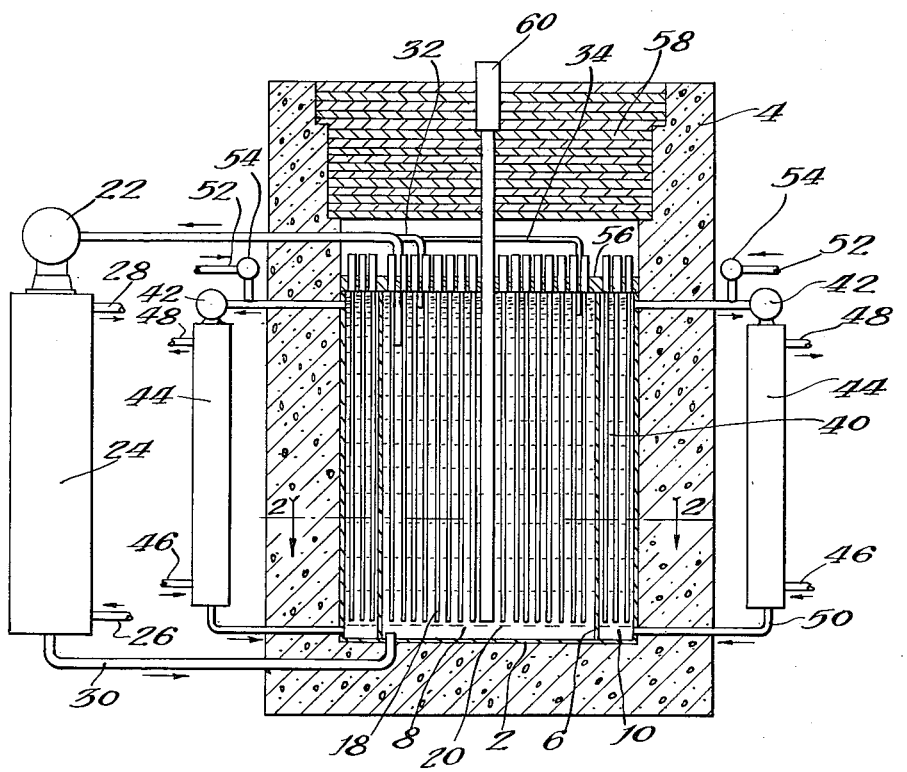
Fig. 1 is a diagrammatic sectional view through a neutronic reactor embodying the invention, with portions of the structure shown in elevation, the section being taken in a vertical plane indicated by the line 1—1 of Fig. 2, associated apparatus being shown diagrammatically.
Figure 2:
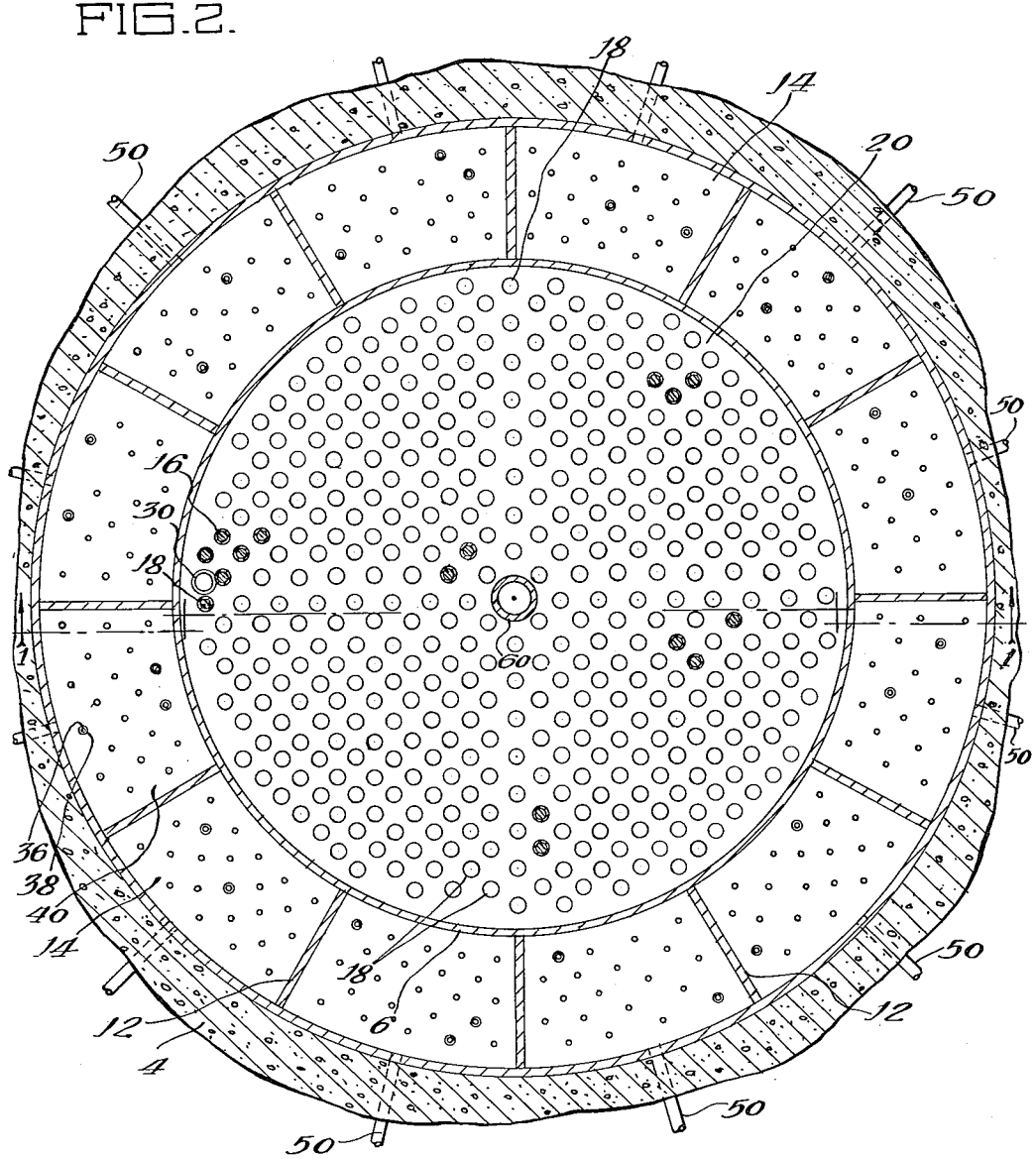
Fig. 2 is an enlarged sectional view taken in the horizontal plane indicated by the line 2—2 of Fig. 1, parts being broken away.

Describing the invention in detail and referring first to Figs. 1 and 2, the reactor comprises a tank or chamber 2 preferably of aluminum or other neutron permeable material. The tank 2 is contained within a concrete vault 4 adapted to absorb to a substantial degree radioactive emanations from the reactor, thereby functioning as a biological shield for the protection of operating personnel. The tank 2 is divided by an aluminum partition or wall 6 into inner and outer chambers 8 and 10, respectively, the outer chamber 10 being divided by partitions 12, into a plurality of fluid tight compartments or cells 14.

The inner chamber 8 is designated the reactor chamber inasmuch as it contains the reactive composition in which the nuclear fission chain reaction is sustained, said composition comprising a plurality of rods 16 of fissionable material, such as the above-mentioned isotopes. The rods 16 are contained within sheaths 18 for the purpose of preventing corrosion of the rods and contamination of the fluid moderator 20 within the inner chamber 8, said moderator being preferably in the form of heavy water.

The moderator 20 is preferably circulated through the chamber 8 by means of a pump 22 (Fig. 1) the suction side of which is connected to the chamber 8 and the discharge side of which is connected to conventional heat exchange means 24 through which coolant fluid is circulated by means of inlet and outlet pumps 26 and 28, respectively. The cooled moderator 20 is conveyed from the heat exchange means 24 to the chamber 8 through a return pipe 30. It will be understood that while one pump 22 and associated heat exchange means 24 are illustrated herein, if desired, a plurality of such pumps and heat exchange means may be utilized.

It will be understood that as a result of the neutronic reaction within the chamber 8, some heavy water is decomposed into $D_2$ and $O_2$, and these decomposition products are removed from the chamber 8 by means of an inert gas such as helium which is circulated through said chamber by inlet and outlet pipes 32 and 34 (Fig. 1). The pipes 32 and 34 are part of a system (not shown) by means of which the $D_2$ and $O_2$ are recombined to form $D_2O$ which may be returned to the chamber 8 through an inlet pipe not shown.

The outer chamber 10 contains a reflector composition adapted to reflect neutrons escaping from the chamber 8 back into this chamber, and also adapted to utilize some of these escaping neutrons to develop new neutrons many of which are directed into the chamber 8 thereby increasing the number of neutrons available therein for the purpose of sustaining a nuclear fission chain reaction. The reflector composition comprises a plurality of rods 36 of fissionable material contained within sheaths 38 adapted to protect the rods from the corrosive action of neutron moderator 40 within the chamber 10, said moderator being preferably in the form of ordinary water ($H_2O$) for the purpose of obtaining an economical structure, as hereinafter discussed.

A pump 42 is associated with each cell 14, said pump having its suction connected to said cell and its discharge side connected to a conventional heat exchanger 44 through which a fluid coolant is circulated by means of inlet and outlet pipes 46 and 48. The cooled moderator is returned to the cell 14 by means of a return pipe 50.

Some of the water moderator 40 as the result of neutron bombardment is decomposed into $H_2$ and $O_2$ which may be vented by any suitable vent means (not shown), additional water being admitted to the system by means of an inlet pipe 52 equipped with a conventional shut-off valve 54. By dividing the chamber 10 into cells 14 as above described, the rate of flow of the moderator 40 necessary to insure adequate cooling thereof is substantially reduced.

The rods 16 and 36 are supported by a cover 56 on the tank 2, and above this cover is a biological shield 58 preferably composed of alternate layers of iron and "Masonite" (compressed wood fiber board). A tube or well 60 extends through the shield 58 and cover 56 to provide a convenient means for inserting into the inner chamber 8 materials which are to be bombarded by neutrons developed within this chamber.

It may be noted that the neutron density within the reactor may be controlled by one or more control rods (not shown) as fully discussed in the above-mentioned copending application.

It will be understood that the reflector composition within the outer chamber 10 functions to increase the reproduction ratio of the reactive composition within the inner chamber 8, thereby accomplishing a nuclear fission chain reaction even though the reactive composition within the chamber 8 is a mass considerably smaller than the critical size at which a chain reaction could be sustained without a reflector. The reproduction factor of the reflector per se is less than unity.

Assuming that the tank 2 and partition 6 are constructed of aluminum having a thickness of 4 millimeters and that the height of the tank 2 is 220 centimeters, a 50 centimeter reflector lattice constructed of 1 centimeter uranium rods with a volume ratio of 2.24 parts of water to 1 part of uranium will reduce the radius of the inner chamber 8 containing the active portion from 158 to approximately 129 centimeters thereby saving approximately 6 tons of heavy water. Such a construction is an extremely economical one, inasmuch as heavy water is much more expensive than uranium at the present time.

Figure 3:
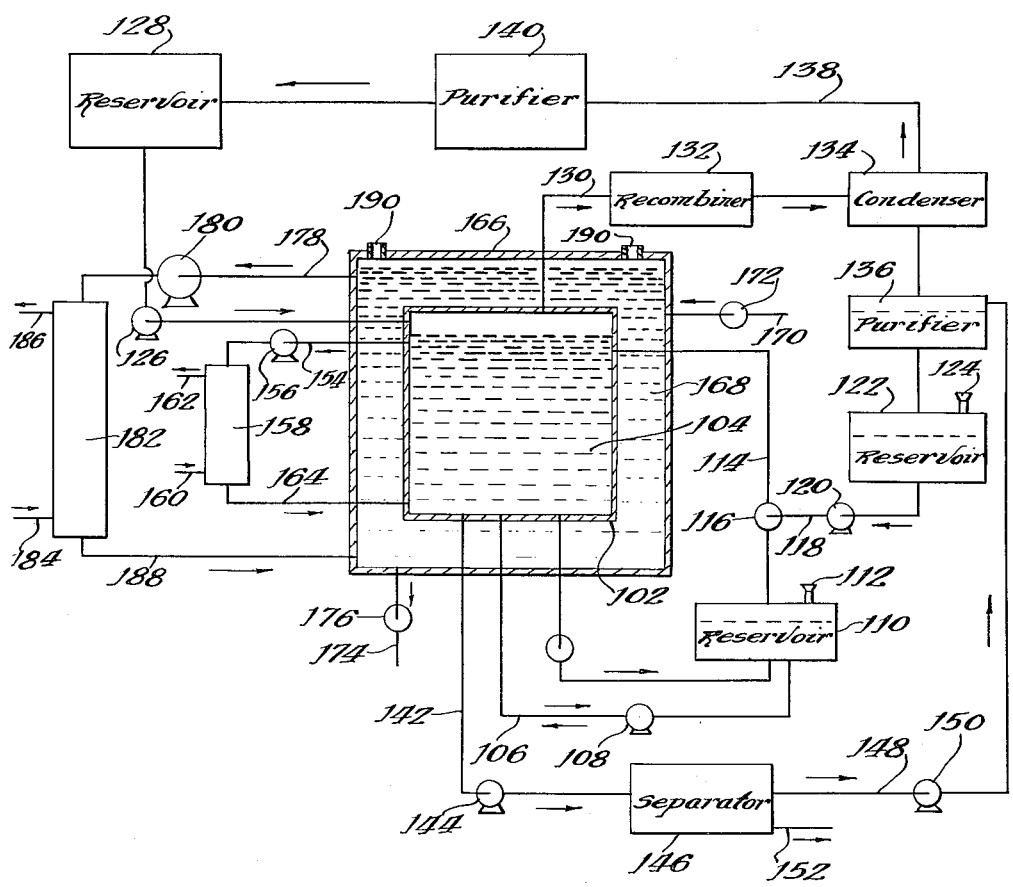
Fig. 3 is a flow diagram illustrating the invention as applied to a homogeneous reactor wherein the reactive composition is in fluid form and is continuously circulated through the system.

Referring now to Fig. 3 the reactor tank or chamber 102 is preferably constructed of aluminum or other neutron permeable material and contains a body 104 of fluid reactive composition preferably in the form of a colloid or slurry of uranium-containing particles and heavy water. The amount of reactive composition 104 as well as the concentration of uranium containing material therein is controlled by a system hereinafter described, said system comprising a line 106 including a reversible delivery pump 108. The line 106 is connected to the bottom of the tank 102 and to a slurry reservoir 110 including an inlet 112 to accommodate the introduction of colloidal particles of uranium-containing material.

A line 114 including a conventional three-way operating valve 116 is connected to the reservoir 110 and to the tank 102 and heavy water is conveyed to the line 114 by a line 118 including a pump 120 having its suction side connected to a heavy water reservoir 122 including an inlet 124 through which heavy water may be admitted to the reservoir 122.

Deuterium and oxygen formed within the tank 102 as decomposition products of the heavy water moderator are swept from the tank 102 by a system including a pump or blower 126 having its suction side connected to helium reservoir 128, said pump having its discharge side connected to the tank 102 above the level of the reactive composition 104 therein. The helium pumped into the tank 102 by the pump 126 is conveyed from said tank along with the deuterium and oxygen through an outlet line 130 connected to a conventional recombiner device 132 which is adapted to recombine the deuterium and oxygen in a heated state into gaseous deuterium oxide or heavy water. The gaseous deuterium oxide is conveyed from the recombiner device 132 to a condenser 134 wherein the deuterium oxide is condensed and is conveyed to a heavy water purifier tank 136 from which the purified heavy water is conveyed to the above-mentioned reservoir 122. Helium is conducted from the condenser 134 through a line 138 into a helium purifier 140 and thence into the above-mentioned helium reservoir 128.

Quantities of the reactive composition 104 are continuously withdrawn from the tank 102 by an outlet line 142 including a pump 144 having its discharge side connected to a separator device 146 containing conventional means (not shown) for separating the heavy water from the uranium-containing particles and other matter. The heavy water is conveyed from the device 146 through a line 148 including a pump 150 having its suction side connected to the before-mentioned heavy water purifier 136, and the uranium-containing particles and other matter are conveyed from the separator device 146 by a line 152 for accomplishing treatment of these particles to enable the recovery of element 94 and fission fragments resulting from the neutronic reaction within the tank 102.

The reactive composition 104 is cooled by a system including an outlet line 154 connected to the tank 102 and including a pump 156 having its discharge side connected to a conventional heat exchanger device 158 through which a fluid coolant is circulated by inlet and outlet pipes 160 and 162. The cooled composition 104 is conveyed from the heat exchanger 158 to the tank 102 through a return pipe 164.

It may be noted that the central reactive composition of the system illustrated in Fig. 3 and described above is more fully set forth and claimed in a copending application, Serial No. 613,356, filed August 29, 1945, in the names of Wigner, Ohlinger, Vernon and Young for "Homogeneous Chain Reacting Deuterium Oxide Pile."

The tank 102 is disposed within a tank or chamber 166 containing a body 168 of reflector composition comprising fluid moderator and fissionable material. The composition 168 is preferably a slurry of uranium-containing particles such as $UO_2$, $UO_3$, or $U_3O_8$ and is admitted to the chamber 166 by an inlet line 170 equipped with a conventional shut-off valve 172. The composition may be drained from tank 166 through an outlet line 174 equipped with a conventional drain valve 176. The composition 168 is cooled by a system including an outlet line 178 connected to the chamber 166, said line including a pump 180 having its discharge side connected to a conventional heat exchanger 182 through which a fluid coolant is circulated by means of inlet and outlet pipes 184 and 186, respectively. The cooled composition 168 is conveyed from the heat exchanger 182 to the chamber 166 through a return pipe 188.

It may be noted that some water in the composition 168 is decomposed into hydrogen and oxygen as the result of neutron bombardment and these decomposition products are vented from the chamber 166 by vent means 190.

Although the compositions 104 and 168 are preferably in the form of colloids or slurries of moderator fluid and uranium-containing material such as $UO_2$, $UO_3$, or $U_3O_8$, it will be understood that either or both of these compositions may be a solution of uranium-containing material such as $UO_2F_2$ or $UO_2SO_4$ in the moderator fluid, said fluid being heavy water in the case of the composition 104 and ordinary water in the case of the composition 168.

It may be noted that although the reflector compositions 40 and 168 have a K value less than unity, nevertheless these compositions are particularly effective to increase the neutron reproduction factor of the enclosed high-K portions by reflecting neutrons into these portions and by utilizing the neutrons escaping from the portions to cause fission of the fissionable material within the reflector compositions, thereby producing additional neutrons many of which are directed inwardly into the high-K portions to increase the number of neutrons available therein for sustaining a nuclear fission chain reaction.

While the theory of the nuclear chain fission mechanism in uranium set forth herein is based on the best presently known experimental evidence, the invention is not limited thereto, as additional experimental data later discovered may modify the theory disclosed. Any such modification of theory, however, will in no way affect the results to be obtained in the practice of the invention herein described and claimed.

Obviously, many modifications may be made in the specific embodiments disclosed without departing from the intended scope of the invention.

What is claimed is:

1. A neutronic reactor comprising a mass of neutronically reactive composition of natural uranium and heavy water having a K factor greater than unity, a mass of a second composition consisting essentially of natural uranium and ordinary water having a K factor less than unity but greater than zero, and means to retain the second composition surrounding the first composition in sufficient quantity to produce an over-all neutron reproduction ratio greater than unity whereby a self-sustaining reaction may be obtained with a reduced quantity of heavy water.

2. A neutronic reactor comprising a tank containing a partition dividing the tank into an inner chamber and an outer chamber surrounding the inner chamber, a reactive composition having a K factor greater than unity consisting of a plurality of natural uranium rods immersed in heavy water in said inner chamber and a reflector composition having a K factor less than unity consisting of a plurality of natural uranium rods immersed in light water in said outer chamber.

References Cited in the file of this patent

UNITED STATES PATENTS

| | | |
|---|---|---|
| 2,206,634 | Fermi et al. | July 2, 1940 |

FOREIGN PATENTS

| | | |
|---|---|---|
| 114,150 | Australia | May 2, 1940 |
| 861,390 | France | Oct. 28, 1940 |
| 233,011 | Switzerland | Oct. 2, 1944 |
| 233,278 | Switzerland | Oct. 16, 1944 |

OTHER REFERENCES

Kelly et al.: Phy. Rev. 73, 1135–9 (1948).
Power, July 1940, pages 56–59.